United States Patent [19]
Dimitri et al.

[11] Patent Number: 5,646,918
[45] Date of Patent: Jul. 8, 1997

[54] OPERATING A MULTI-GRIPPER ACCESSOR IN AN AUTOMATED STORAGE SYSTEM

[75] Inventors: Kamal Emile Dimitri; John Edward Kulakowski; Rodney Jerome Means, all of Tucson, Ariz.

[73] Assignee: International Business Machines Corporation, Armonk, N.Y.

[21] Appl. No.: 569,386

[22] Filed: Dec. 8, 1995

[51] Int. Cl.⁶ .................................................. G11B 17/22
[52] U.S. Cl. .................... 369/34; 414/273; 364/478.02
[58] Field of Search ............................... 369/34, 36, 37, 369/38, 40, 41, 42; 414/268, 273, 274, 275; 364/478.01, 478.02, 478.03, 479.01, 479.05

[56] References Cited

U.S. PATENT DOCUMENTS

| | | | |
|---|---|---|---|
| 3,831,197 | 8/1974 | Beach et al. | 360/71 |
| 4,864,438 | 9/1989 | Munro | 360/92 |
| 4,864,511 | 9/1989 | Moy et al. | 369/39 |
| 4,945,428 | 7/1990 | Waldo | 360/92 |
| 5,345,350 | 9/1994 | Ellis et al. | 360/92 |
| 5,450,385 | 9/1995 | Ellis et al. | 369/34 |
| 5,471,445 | 11/1995 | Emberty et al. | 369/34 |
| 5,497,057 | 3/1996 | Danielson et al. | 369/34 |
| 5,500,803 | 3/1996 | Munro et al. | 364/478 |
| 5,546,315 | 8/1996 | Kleinschnitz | 369/34 |
| 5,557,528 | 9/1996 | Munro et al. | 364/478.02 |

OTHER PUBLICATIONS

"Disposition Switching Algorithm for Two–Gripper Picker" IBM Tech. Discl. Bulletin, Mar., 1991, vol. 33, No. 10B, pp. 439–440.

"Dual–Gripper Commands for an Automated Tape Library:" IBM Tech. Discl. Bulletin, Oct., 1991, vol. 34, No. 5, pp. 168–170.

"Fuzzy Network for Dual–Gripper–Picker Library Control" IBM Tech. Discl. Bulletin, Oct., 1994, vol. 37, No. 10, pp. 417–420.

*Primary Examiner*—Tan Dinh
*Attorney, Agent, or Firm*—D. A. Shifrin

[57] ABSTRACT

In an automated storage and retrieval library system, a library controller is directed to examine a command queue, as well as the state of the grippers and the state of the data drive units. In general, upon completion of the examination, the controller determines whether an additional command, currently in the queue, can be executed in conjunction with (that is, before, during or after) execution of the current command, thereby optimizing the utilization of the accessor. For example, if the accessor is to execute an exchange command, a move command might be in the queue which requires moving a cartridge from the area in which the accessor will be located after the exchange is made but before the exchanged cartridge is moved to a new location. In such an event, the controller will direct that the move command be overlapped with the second half of the exchange command by using the empty gripper. Execution of other commands can be overlapped with the first half of exchange commands or can be performed in conjunction with move commands.

13 Claims, 3 Drawing Sheets

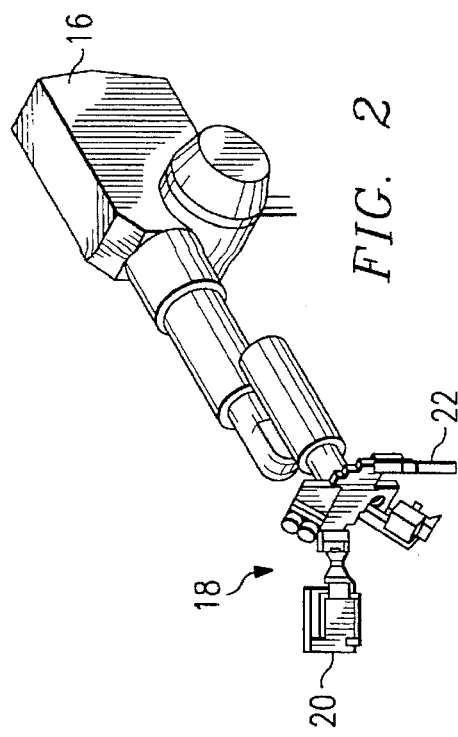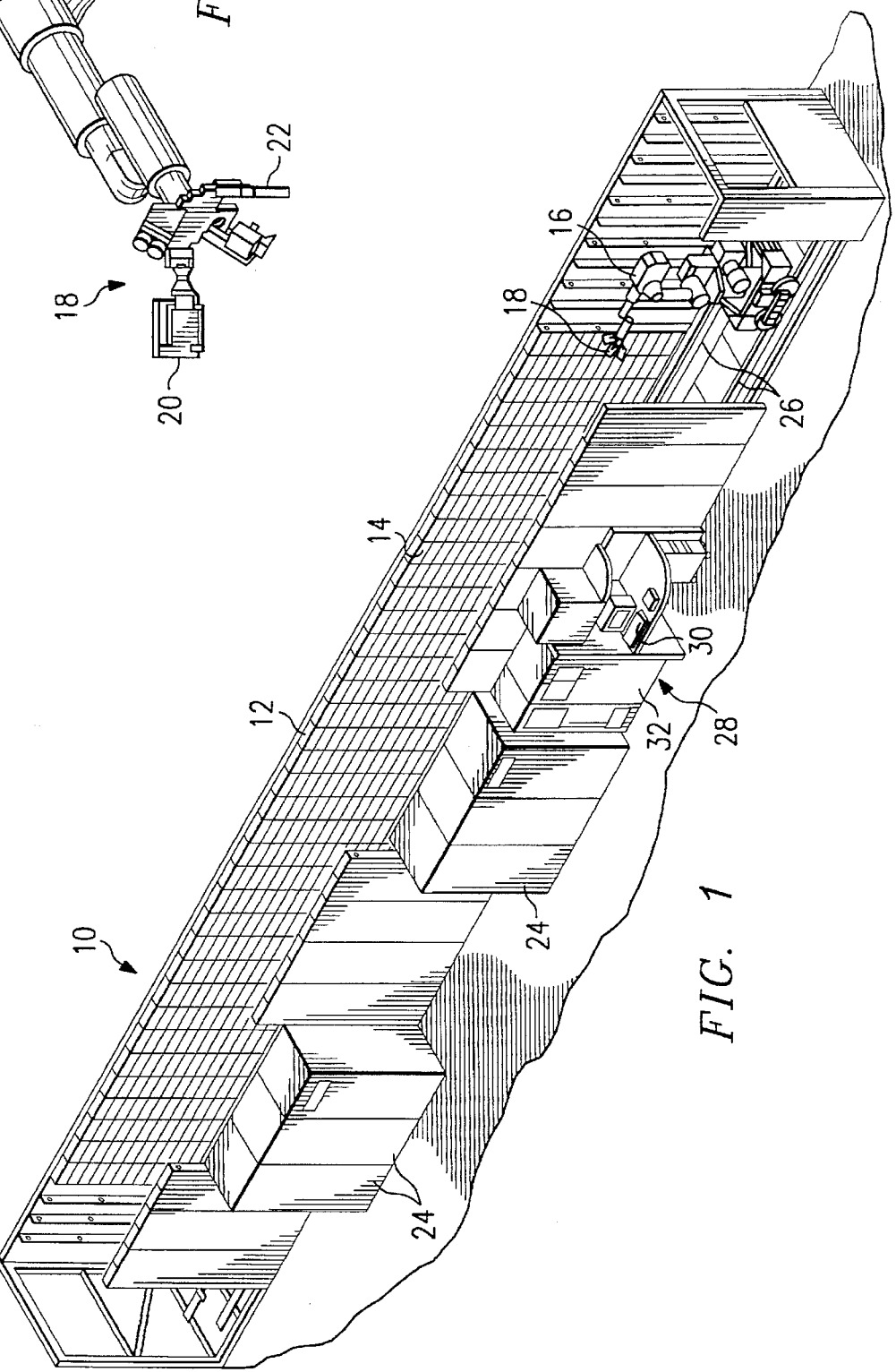

OPERATING A MULTI-GRIPPER ACCESSOR IN AN AUTOMATED STORAGE SYSTEM

TECHNICAL FIELD OF THE INVENTION

The present invention relates to automated storage and retrieval library systems, and in particular, to increasing the efficiency of the operation of a multi-gripper accessor in a library system.

BACKGROUND OF THE INVENTION

In an automated information storage and retrieval system, also known as a library, numerous storage cells arrayed within the library are used to hold removable information media, such as magnetic tape cartridges or optical disk cartridges. (The term "cartridge" used herein refers to any housing structure for removable media; the present invention is not limited to a library for storing any particular type of media.) An accessor, furnished with a holding or gripping device and under the direction of a library controller, transports selected cartridges between storage cells and drive units. The library controller is interconnected with a host device, such as a mainframe or network computer, which issues control signals related to reading/writing data from/to selected cartridges. Library units also typically include an input/output station or port through which a system operator can pass a cartridge to be added to the storage array and through which the accessor can pass a cartridge to the operator for removal.

In larger library systems, an accessor with two or more grippers can be employed to increase the speed with which a desired cartridge is retrieved from a storage cell and mounted in a drive. In a library with a single-gripper accessor, when a drive unit has completed accessing data on a first cartridge and access to data on a second cartridge is desired, the process is as follows:

the accessor moves to the drive;

the first cartridge is removed from the drive;

the first cartridge is transported from the drive to an empty cell;

the first cartridge is put into the empty cell;

the accessor moves to the storage cell of the second cartridge;

the second cartridge is retrieved from its cell;

the second cartridge is transported to the drive; and the second cartridge is inserted in the drive.

In a library with a multi-gripper accessor, the same process is as follows:

the accessor moves to the cell of the second cartridge;

the second cartridge is retrieved by the first gripper;

the second cartridge is transported from its cell to the drive; and the first and second cartridges are exchanged in the drive.

Upon completion of either of these two processes, the library controller obtains the next access command from a queue or directly from the host.

It will be appreciated that managing cartridges in a library with a multi-gripper accessor can be significantly faster than doing so in a library with just a single-gripper accessor.

In some libraries, each cartridge has an assigned, fixed "home" cell to which the cartridge is returned after use. In other libraries, cartridges do not have assigned, fixed home cells but, rather, are returned to any available, unoccupied cell, called a "floating home" cell. In combination with a multi-gripper accessor, cartridge exchanges can occur at cell locations as well as at drive locations, thereby reducing still further the time required to retrieve and mount cartridges.

While some small libraries have only one or two drive units and sixteen to sixty-four storage cells, larger libraries may have sixteen or more drives and 18,000 or more storage cells. There is a need, therefore, for improving the efficiency of accessor operations to decrease the amount of time between a data request being received from the host and the desired cartridge being mounted in a drive.

SUMMARY OF THE INVENTION

In view of the foregoing, it is an object of the present invention to decrease data access time in a library by improving the efficiency of the operation of a multi-gripper accessor.

It is a further object of the present invention to improve accessor efficiency by directing the library controller to examine the work queue for accessor commands which can be executed before, during or after execution of a current accessor operation.

These and other objectives are achieved in this invention by directing the library controller to examine the queue, as well as the state of the grippers and the state of the drives. In general, upon completion of the examination, the controller determines whether an additional command, currently in the queue, can be executed in conjunction with (that is, before, during or after) execution of the current command, thereby optimizing the utilization of the accessor. For example, if the accessor is to execute an exchange command, a move command might be found in the queue which requires moving another cartridge from the drive area where the accessor will be located after the exchange is made but before the exchanged cartridge is moved to a storage location. In such an event, the controller will direct that the move command be overlapped with the second half of the exchange command by using the empty gripper. Execution of other commands can be overlapped with the first half of exchange commands or can be performed in conjunction with move commands.

The foregoing and other features and advantages of the invention will be apparent from the following more particular description of preferred embodiments of the invention, as illustrated in the accompanying drawings.

BRIEF DESCRIPTION OF THE DRAWINGS

FIG. 1 is a perspective view of an automated storage and retrieval library system with a dual-gripper accessor in which the present invention can be implemented;

FIG. 2 is an enlarged perspective view of a portion of the dual-gripper accessor shown in FIG. 1;

DETAILED DESCRIPTION OF THE INVENTION

Figure 3A:
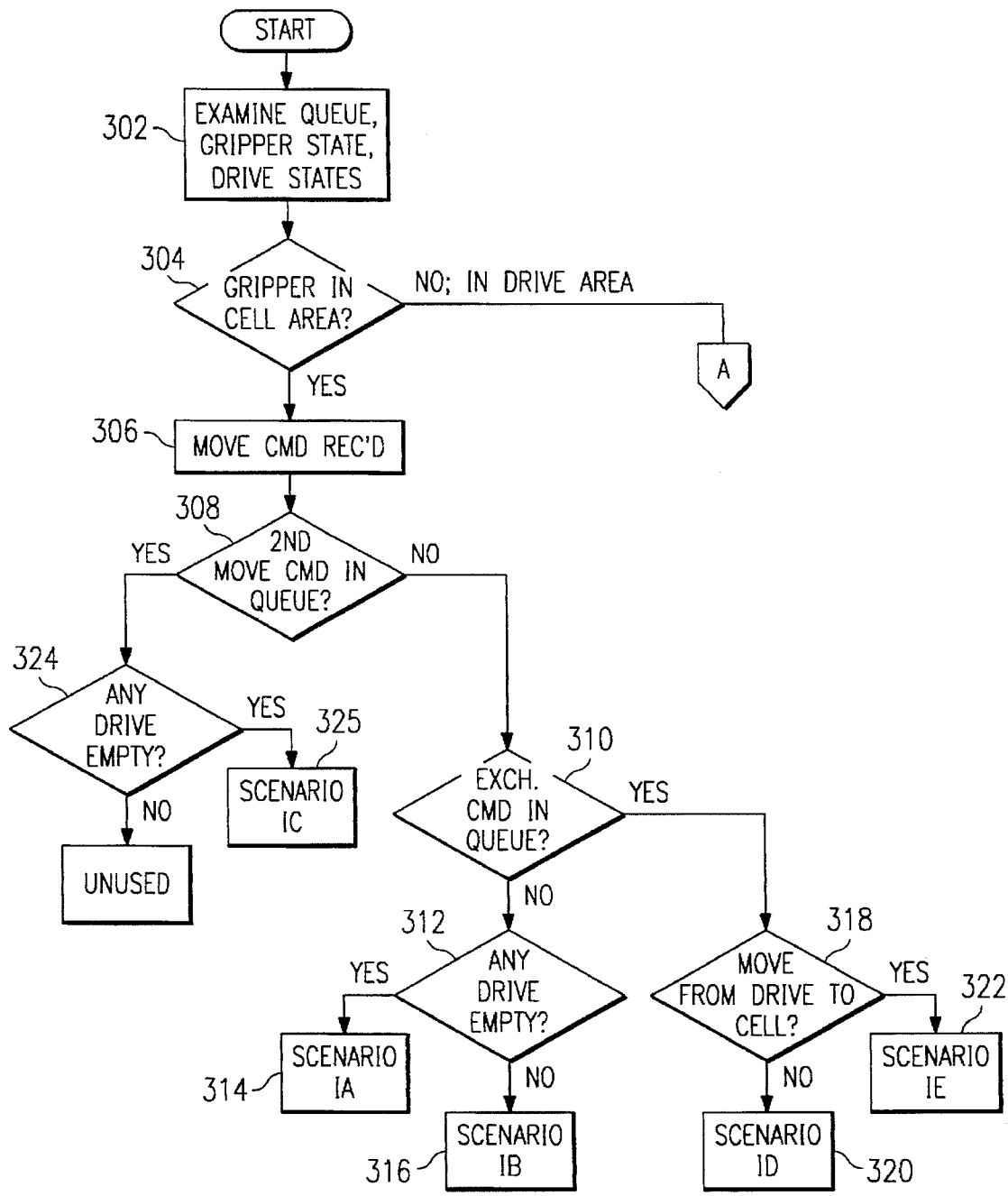
FIG. 3A is a portion of a flowchart of the decision making process of the present invention.

FIG. 1 illustrates an automated storage and retrieval library system 10 with the top and some side panels removed to show the interior (the library shown, an IBM Model 3495 Tape Library Dataserver, is used for illustrative purposes only; the present invention can be incorporated in other libraries). The library 10 includes an array of storage slots or cells 12 arranged in columns on two of the interior walls to hold media cartridges 14. A robotic accessor 16 (shown enlarged in FIG. 2) includes a dual-gripper assembly 18 (having first and second grippers 20 and 22) for holding one or two cartridges 14 and transporting them between cells 12 and data drive units 24. (Although the description herein is directed toward a dual-gripper accessor, the invention is not limited to such but is applicable to accessors with more than two grippers.) The accessor 16 rides along a track 26 enabling the grippers 20 and 22 to remove and replace cartridges from and to the cells on both inside walls. A controller 28, with an operator terminal 30, directs all aspects of the operation of the library 10, including the activities of the accessor 16. Random access memory is used to hold a queue 32 of accessor commands received from a host computer (not shown) to which the library 10 is interconnected.

Figure 3B:
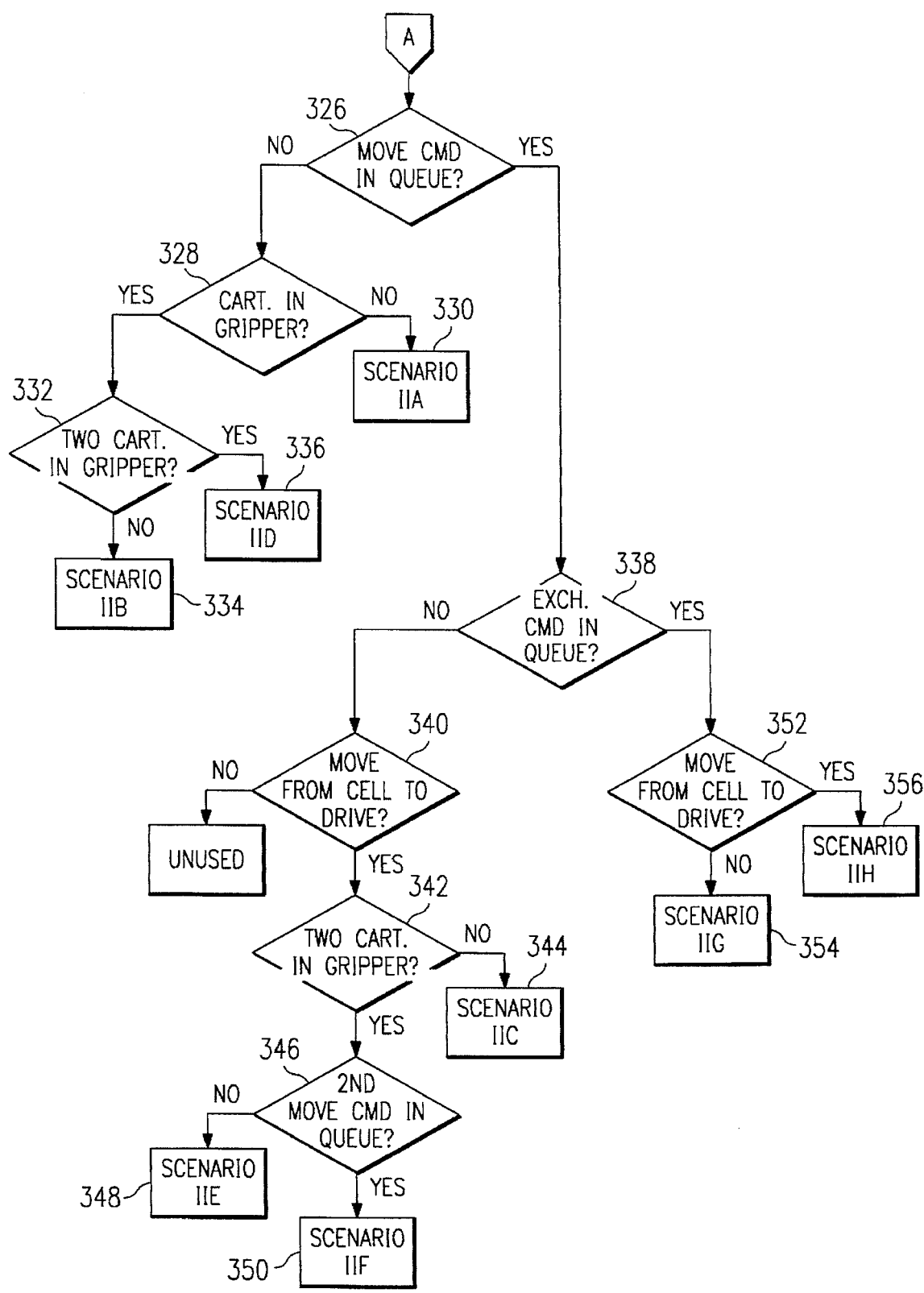
FIG. 3B is the remaining portion of the flowchart of the decision making process of the present invention.

The two basic accessor/cartridge command are "move" and "exchange". When executing a move command, it is assumed that one or both of the two grippers 20 and 22 are empty. The accessor 16 travels to the location of a desired cartridge (storage cell or drive unit), retrieves the cartridge from the location, transports the cartridge to a new location (drive unit or storage cell) and inserts it in the new location. When executing an exchange command, it is assumed that the first 20 of the two grippers is gripping a first cartridge while the second gripper 22 is empty. The accessor 16 travels to the location of a desired second cartridge (storage cell or drive unit), retrieves the second cartridge from the location with the second gripper 22, inserts the first cartridge into the location with the first gripper 20, then transports the second cartridge to a new location (drive unit or storage cell). FIGS. 3A and 3B together are a flowchart of the process of the present invention, illustrating representative decisions which are made by the controller 28 to reach the scenarios described below. The order in which the decisions appear in the flowchart has been selected for clarity; the decisions can be made in other orders without affecting the described outcomes. In the present invention, when the library controller 28 receives an accessor command from the host, or when it retrieves a command from the queue 32, other commands in the queue are examined, as well as the state of the grippers 20 and 22 and the state of the drives 24 (Step 302). In general, upon completion of the examination, the controller 28 determines whether one or more additional commands, currently in the queue 32, can be executed in conjunction with (that is, before, during or after) execution of the current command, thereby optimizing the utilization of the accessor 16. Alternatively, such determination can be made by the host which can then formulate a new combination of appropriate move and exchange commands to be transmitted to the controller 28. For example, if the accessor 16 is to execute an exchange command, a move command might be in the queue 32 which requires moving a cartridge from the area in which the accessor 16 will be located after the exchange is made but before the exchanged cartridge is moved to a new location. In such an event, the controller 28 (or the host) will direct that the move command be over-lapped with the second half of the exchange command by using the empty gripper. As an example of the controller 24 (or the host) looking ahead in the queue 32 to coordinate more than two commands, a command to move a first cartridge to a first drive unit may be followed by a command to exchange two other cartridges at a second drive unit, followed by a command to move a fourth cartridge from a third drive unit to the cell area. As another example, a command to move a first cartridge to a drive unit may be followed by a command to move a second cartridge from a drive unit to the cell area, followed by a command to move a third cartridge from the cell area to a drive unit, followed by a command to move a fourth cartridge from a drive unit to the cell area. Other combinations of commands can, of course, be assembled and executed and typically, the order of commands in the queue will not affect the process.

More specifically, based upon the examination of the queue 32 and the states of the drives 24 and accessor 16, if the controller 28 has determined that the accessor 16 is in the cell area (Step 304) and the command received is a move command (Step 306), the controller 28 determines whether a second command in the queue 32 is a move command (Step 308). If a second move command is in the queue 32 (Step 308) and if any drives 24 are empty (Step 324), then the actions of scenario IC are performed (Step 325). If there is no second command in the queue (Step 310), and if a drive unit 24 is empty (Step 312), then the actions of scenario IA are performed (Step 314, each of the scenarios is described separately below). If no drive unit is empty, then the actions of scenario IB are performed (Step 316). On the other hand, if a second command in the queue 32 is an exchange command (Step 310), the controller 28 determines whether the move command is a command to move a cartridge from a cell 12 to a drive 24 or from a drive 24 to a cell 12 (Step 318). If the former, the actions of scenario ID are performed (Step 320); if the latter, the actions of scenario IE are performed (Step 322).

If the accessor 16 is in the drive area (Step 304), the controller 28 determines whether the command is a move command (Step 326). If not (that is, if there are no commands to be processed), a determination is made whether the accessor 16 is holding a cartridge (Step 328). If not, the actions of scenario IIA are performed (Step 330). If the accessor 16 is holding a single cartridge (Step 332), the actions of scenario IIB are performed (Step 334); if the accessor 16 is holding two cartridges (Step 332), the actions of scenario IID are performed (Step 336).

If the command is a move command (Step 326), the controller 28 determines whether a second command is an exchange command (Step 338). If not and if the first move command is a command to move a cartridge from a cell 12 to a drive 24 (Step 340), the number of cartridges in the accessor 16 is examined (Step 342). If the accessor 16 is holding a single cartridge, the actions of scenario IIC are performed (Step 344). If the accessor 16 is holding two cartridges, and if a second command is not a move command (Step 346), the actions of scenario IIE are performed (Step 348); if the second command is a move command, the actions of scenario IIF are performed (Step 350).

If the second command in the queue 32 is an exchange command (Step 338), the controller determines whether the move command is to move a cartridge from a drive 24 to a cell 12 or a cell 12 to a drive 24 (Step 352). If the former, the actions of scenario IIG are performed (Step 354); if the latter the actions of scenario IIH are performed (Step 356).

The following scenarios are intended to be representative of various combinations of accessor/cartridge commands, drive states and accessor location and states, but they are not exhaustive:

I) The accessor is currently located in the cell area:
  A) Conditions: the queue contains a command to move one cartridge from a cell to a drive unit and at least one drive is empty;
    Action: get the desired cartridge from its storage cell; transport it to the drive area; and put the cartridge in an empty drive.
  B) Conditions: the queue contains a command to move a first cartridge from a cell to a drive unit; two grippers are empty; and no drive is empty;

Action: get the first cartridge from its storage cell; transport it to the drive area; get a second cartridge from a drive with the empty gripper; and put the first cartridge in the now-empty drive with the first gripper (henceforth, the process of getting a first cartridge from a location with an empty gripper and putting a second cartridge in the same location with the other gripper will be referred to as exchanging the second cartridge for the first at the location).

C) Conditions: the queue contains two commands to move first and second cartridges from storage cells to drives and one drive is empty;
Action: get the first cartridge from its storage cell; get the second cartridge from its storage cell; transport the two cartridges to the drive area; put the first cartridge in the empty first drive; and exchange the second cartridge for a third cartridge in a second drive.

D) Conditions: the queue contains a command to exchange first and second cartridges at a first drive and a command to move a third cartridge from a cell to a second drive which is empty;
Action: get the first cartridge from its storage cell; get the third cartridge from its storage cell; transport the first and third cartridges to the drive area; put the third cartridge into the second, empty drive; and exchange the first and second cartridges at the first drive.

E) Conditions: the queue contains a command to exchange first and second cartridges at a first drive and a command to move a third cartridge from a second drive to a storage cell;
Action: get the first cartridge from its storage cell; transport the first cartridge to the drive area; exchange the first and second cartridges at the first drive; get the third cartridge from the second drive; transport the second and third cartridges to the cell area; put the second cartridge into an empty cell; and put the third cartridge in a cell.

II) The accessor is currently located in the drive area:

A) Conditions: the queue contains no commands and the accessor holds no cartridges (the accessor is idle);
Action: move the accessor to the cell area and await a command.

B) Conditions: the queue contains no commands and the accessor holds one cartridge;
Action: transport the cartridge to the cell area and put the cartridge in a cell.

C) Conditions: the queue contains a command to move a first cartridge from a first storage cell to a drive and there is a second cartridge in the gripper;
Action: transport the second cartridge to the cell area; exchange the second and first cartridges at the first cell; transport the first cartridge to the drive area; and put the first cartridge in a drive.

D) Conditions: the queue contains no commands and the accessor holds first and second cartridges;
Action: transport the cartridges to the cell area; put the first cartridge in a first cell; and put the second cartridge in a second cell.

E) Conditions: the queue contains a command to move a first cartridge from a storage cell to a drive; the drive contains a second cartridge; and the accessor holds third and fourth cartridges;
Action: transport the third and fourth cartridges to the cell area; put the third cartridge in a first cell; exchange the fourth cartridge for the first cartridge at a second cell; transport the first cartridge to the drive area; and exchange the first cartridge for the second cartridge at the drive.

F) Conditions: the queue contains two commands to move first and second cartridges from storage cells to two drives, which are both empty, and the accessor holds third and fourth cartridges;
Action: transport the third and fourth cartridges to the cell area; put the third cartridge in a first cell; exchange the fourth and first cartridges at a second cell; get the second cartridge from a third cell; transport the first and second cartridges to the drive area; put the first cartridge in the first drive; and put the second cartridge in the second drive.

G) Conditions: the queue contains a first command to exchange a first cartridge, currently in a first drive, with a second cartridge, currently in a cell and a second command to move a third cartridge from a second drive to a cell; and both grippers are empty;
Action: get the first cartridge from the first drive; get the third cartridge from the second drive; transport the first and third cartridges to the cell area; put the third cartridge in a first cell; exchange the first and second cartridges at a second cell; transport the second cartridge to the drive area; and put the second cartridge in a drive.

H) Conditions: the queue contains a first command to exchange first and second cartridges at a cell and a second command to move a third cartridge from a cell to a drive; and both grippers are empty;
Action: get the first cartridge from a drive; transport the first cartridge to the cell area; exchange the first and second cartridges at a first cell; get the third cartridge from a second cell; transport the second and third cartridges to the drive area; put the second cartridge in a first drive; and put the third cartridge in a second drive.

Although not specifically stated as a separate step in any of the above described scenarios, before the accessor 16 is moved from a cell 12 or a drive 24, even in the middle of executing a command, it is preferred that the library controller 28 examine the queue, the state of the grippers 20 and 22 and the state of the drives 24. A determination is then made whether another command can be executed in combination with any remaining portion of a partially executed current command. Such a determination is also made upon completion of each of the scenarios.

While the invention has been particularly shown and described with reference to preferred embodiments thereof, it will be understood by those skilled in the art that various changes in form and details may be made therein without departing from the spirit and scope of the invention.

What is claimed is:

1. A method of operating a multi-gripper accessor in an automated storage and retrieval library housing a plurality of removable data cartridges in an array of storage cells, the library having at least one drive unit for reading information from the cartridges and a library controller for directing the activities of the accessor and the drive units, the library controller having a queue for storing accessor activity commands, the method comprising the steps of:

A) receiving a first command in the queue;

B) determining if the accessor is in a drive area of the library or in a cell area of the library;

C) if the accessor is in the cell area of the library:

C1) determining if the first command is a command to move a cartridge or to exchange cartridges;
  C1a) if the first command received is a command to exchange cartridges at a drive unit, determining if a second command in the queue is a command to move a cartridge from a drive unit to a storage cell or to move a cartridge from a storage cell to a drive unit;
    C1ai) if the second command is a command to move a cartridge from a drive unit to a storage cell:
getting a first cartridge from a first storage cell;
transporting the first cartridge to a first drive unit in the drive area;
exchanging the first cartridge for a second cartridge in the drive unit;
getting a third cartridge from a second drive unit;
transporting the second and third cartridges to the cell area;
putting the second cartridge into a second cell; and
putting the third cartridge into a third cell; and
    C1aii) if the second command is a command to move a cartridge from a storage cell to a drive unit:
getting a first cartridge from a first storage cell;
getting a second cartridge from a second storage cell;
transporting the first and second cartridges to the drive area;
putting the first cartridge in a first drive unit;
exchanging the second cartridge for a third cartridge in a second drive unit;
transporting the third cartridge to the cell area; and
putting the third cartridge in a third storage cell; and
D) if the accessor is in the drive area of the library:
  D1) if the first command is a command to move at least one cartridge, determining if a second command in the queue is a command to exchange cartridges at a storage cell;
    D1a) if the second command in the queue is a command to exchange cartridges at a storage cell, determining if the first command is a command to move a cartridge from a drive unit to a storage cell;
      D1ai) if the first command is a command to move a cartridge from a drive unit to a storage cell:
getting a first cartridge from a first drive unit;
getting a second cartridge from a second drive unit;
transporting the first and second cartridges to the cell area;
putting the second cartridge in a second cell; and
exchanging the first cartridge for a third cartridge in a first cell; and
      D1aii) if the first command is a command to move a cartridge from a storage cell to a drive unit:
getting a first cartridge from a first drive unit;
transporting the first cartridge to the cell area;
exchanging the first cartridge for a second cartridge in a first storage cell;
getting a third cartridge from a second storage cell;
transporting the third cartridge to the drive area; and
putting the third cartridge in a second drive unit.
2. The method of claim 1, further comprising the steps of:
  C1b) if the first command received is a command to move a cartridge to a drive unit, determining if a second command in the queue is a command to move a cartridge from a storage cell to a drive unit;
    C1bi) if the second command in the queue is a command to move a cartridge from a storage cell to a drive unit and if at least one drive unit is available to receive a cartridge:
getting a first cartridge from a first storage cell;
getting a second cartridge from a second storage cell;
transporting the first and second cartridges to the drive area;
putting the first cartridge in a first available drive unit;
determining if a second drive unit is available to receive the second cartridge;
if the second drive unit is available, putting the second cartridge in the second available drive unit; and
if the second drive unit is unavailable, exchanging the second cartridge for a third cartridge in the second drive unit.
3. The method of claim 1, further comprising the steps of:
  D1b) if the second command in the queue is a command to move a cartridge to a drive unit and if the first command is a command to move a cartridge from a storage cell to a drive unit, determining if there are two cartridges in the accessor;
    D1bi) if there are two cartridges in the accessor and if there are two available drive units:
transporting first and second cartridges to the cell area;
putting the first cartridge in a first storage cell;
exchanging the second cartridge for a third cartridge in a second storage cell;
getting a fourth cartridge from a third storage cell;
transporting the third and fourth cartridges to the drive area;
putting the third cartridge in a first available drive unit; and
putting the fourth cartridge in a second available drive unit; and
    D1bii) if there are two cartridges in the accessor and if there is only one available drive unit:
transporting first and second cartridges to the cell area;
putting the first cartridge in a first storage cell;
exchanging the second cartridge for a third cartridge in a second storage cell;
getting a fourth cartridge from a third storage cell;
transporting the third and fourth cartridges to the drive area;
putting the third cartridge in a first available drive unit; and
exchanging the fourth cartridge for a fifth cartridge in a second available drive unit.
4. The method of claim 1, further comprising the steps of:
E) executing the first command;
F) if, after execution of the first command has been completed, the accessor is in the drive area and a second command is not in the queue, moving the accessor to the cell area; and
G) waiting for a second command to be received.
5. A method of operating a multi-gripper accessor in an automated storage and retrieval library housing a plurality of removable data cartridges in an array of storage cells, the library having at least one drive unit for reading information from the cartridges and a library controller for directing the activities of the accessor and the drive units, the library controller having a queue for storing accessor activity commands, the method comprising the steps of:

A) receiving a first command in the queue;

B) determining if the accessor is in a drive area of the library or in a cell area of the library;

C) if the accessor is in the cell area of the library:

C1) determining if the first command is a command to move a cartridge or to exchange cartridges;

C1a) if the first command received is a command to exchange cartridges at a drive unit, determining if a second command in the queue is a command to move a cartridge from a drive unit to a storage cell or to move a cartridge from a storage cell to a drive unit;

C1ai) if the second command is a command to move a cartridge from a drive unit to a storage cell:

getting a first cartridge from a first storage cell;

transporting the first cartridge to a first drive unit in the drive area;

exchanging the first cartridge for a second cartridge in the drive unit;

getting a third cartridge from a second drive unit;

transporting the second and third cartridges to the cell area;

putting the second cartridge into a second cell; and putting the third cartridge into a third cell.

6. A method of operating a multi-gripper accessor in an automated storage and retrieval library housing a plurality of removable data cartridges in an array of storage cells, the library having at least one drive unit for reading information from the cartridges and a library controller for directing the activities of the accessor and the drive units, the library controller having a queue for storing accessor activity commands, the method comprising the steps of:

A) receiving a first command in the queue;

B) determining if the accessor is in a drive area of the library or in a cell area of the library;

C) if the accessor is in the cell area of the library:

C1) determining if the first command is a command to move a cartridge or to exchange cartridges;

C1a) if the first command received is a command to exchange cartridges at a drive unit, determining if a second command in the queue is a command to move a cartridge from a drive unit to a storage cell or to move a cartridge from a storage cell to a drive unit;

C1ai) if the second command is a command to move a cartridge from a storage cell to a drive unit:

getting a first cartridge from a first storage cell;

getting a second cartridge from a second storage cell;

transporting the first and second cartridges to the drive area;

putting the first cartridge in a first drive unit;

exchanging the second cartridge for a third cartridge in a second drive unit;

transporting the third cartridge to the cell area; and putting the third cartridge in a third storage cell.

7. A method of operating a multi-gripper accessor in an automated storage and retrieval library housing a plurality of removable data cartridges in an array of storage cells, the library having at least one drive unit for reading information from the cartridges and a library controller for directing the activities of the accessor and the drive units, the library controller having a queue for storing accessor activity commands, the method comprising the steps of:

A) receiving a first command in the queue;

B) determining if the accessor is in a drive area of the library or in a cell area of the library;

C) if the accessor is in the drive area of the library:

C1) if the first command is a command to move at least one cartridge, determining if a second command in the queue is a command to exchange two cartridges at a cell;

C1a) if the second command in the queue is a command to exchange two cartridges, determining if the first command is a command to move a cartridge from a drive unit to a storage cell;

C1ai) if the first command is a command to move a cartridge from a drive unit to a storage cell:

getting a first cartridge from a first drive unit;

getting a second cartridge from a second drive unit;

transporting the first and second cartridges to the cell area;

putting the second cartridge in a second cell;

exchanging the first cartridge for a third cartridge in a first cell;

transporting the third cartridge to the drive area; and putting the third cartridge in a drive unit.

8. A method of operating a multi-gripper accessor in an automated storage and retrieval library housing a plurality of removable data cartridges in an array of storage cells, the library having at least one drive unit for reading information from the cartridges and a library controller for directing the activities of the accessor and the drive units, the library controller having a queue for storing accessor activity commands, the method comprising the steps of:

A) receiving a first command in the queue;

B) determining if the accessor is in a drive area of the library or in a cell area of the library;

C) if the accessor is in the drive area of the library:

C1) if the first command is a command to move at least one cartridge, determining if a second command in the queue is a command to exchange cartridges at a cell;

C1a) if the second command in the queue is a command to exchange cartridges, determining if the first command is a command to move a cartridge from a drive unit to a storage cell;

C1ai) if the first command is a command to move a cartridge from a storage cell to a drive unit:

getting a first cartridge from a first drive unit;

transporting the first cartridge to the cell area;

exchanging the first cartridge for a second cartridge in a first storage cell;

getting a third cartridge from a second storage cell;

transporting the second and third cartridges to the drive area;

putting the second cartridge in a second drive unit; and putting the third cartridge in a third drive unit.

9. A program storage medium, readable by a computer, tangibly embodying a program of instructions executable by the computer for operating a multi-gripper accessor in an automated storage and retrieval library housing a plurality of removable data cartridges in an array of storage cells, the library having at least one drive unit for reading information from the cartridges and a library controller for directing the activities of the accessor and the drive units, the library controller having a queue for storing accessor activity commands, the program comprising instructions for:

A) receiving a first command in the queue;

B) determining if the accessor is in a drive area of the library or in a cell area of the library;

C) if the accessor is in the cell area of the library:

C1) determining if the first command is a command to move a cartridge or to exchange cartridges at a drive unit;

C1a) if the first command received is a command to exchange cartridges, determining if a second command in the queue is a command to move a cartridge from a drive unit to a storage cell or to move a cartridge from a storage cell to a drive unit;

C1ai) if the second command is a command to move a cartridge from a drive unit to a storage cell:

getting a first cartridge from a first storage cell;

transporting the first cartridge to a first drive unit in the drive area;

exchanging the first cartridge for a second cartridge in the drive unit;

getting a third cartridge from a second drive unit;

transporting the second and third cartridges to the cell area;

putting the second cartridge into a second cell; and putting the third cartridge into a third cell; and C1aii) if the second command is a command to move a cartridge from a storage cell to a drive unit:

getting a first cartridge from a first storage cell;

getting a second cartridge from a second storage cell;

transporting the first and second cartridges to the drive area;

putting the first cartridge in a first drive unit;

exchanging the second cartridge for a third cartridge in a second drive unit;

transporting the third cartridge to the cell area; and putting the third cartridge in a third storage cell; and D) if the accessor is in the drive area of the library:

D1) if the first command is a command to move at least one cartridge, determining if a second command in the queue is a command to exchange cartridges;

D1a) if the second command in the queue is a command to exchange cartridges at a cell, determining if the first command is a command to move a cartridge from a drive unit to a storage cell;

D1ai) if the first command is a command to move a cartridge from a drive unit to a storage cell:

getting a first cartridge from a first drive unit;

getting a second cartridge from a second drive unit;

transporting the first and second cartridges to the cell area;

putting the second cartridge in a second cell; and exchanging the first cartridge for a third cartridge in a first cell; and D1aii) if the first command is a command to move a cartridge from a storage cell to a drive unit:

getting a first cartridge from a first drive unit;

transporting the first cartridge to the cell area;

exchanging the first cartridge for a second cartridge in a first storage cell;

getting a third cartridge from a second storage cell;

transporting the third cartridge to the drive area; and putting the third cartridge in a second drive unit.

10. The program storage medium of claim 9, wherein the program further comprises instructions for:

C1b) if the first command received is a command to move a cartridge to a drive unit, determining if a second command in the queue is a command to move a cartridge from a storage cell to a drive unit;

C1bi) if the second command in the queue is a command to move a cartridge from a storage cell to a drive unit and if at least one drive unit is available to receive a cartridge:

getting a first cartridge from a first storage cell;

getting a second cartridge from a second storage cell;

transporting the first and second cartridges to the drive area;

putting the first cartridge in a first available drive unit;

determining if a second drive unit is available to receive the second cartridge;

if the second drive unit is available, putting the second cartridge in the second available drive unit; and if the second drive unit is unavailable, exchanging the second cartridge for a third cartridge in the second drive unit.

11. The program storage medium of claim 9, wherein the program further comprises instructions for:

D1b) if the second command in the queue is a command to move a cartridge to a drive unit and if the first command is a command to move a cartridge from a storage cell to a drive unit, determining if there are two cartridges in the accessor;

D1bi) if there are two cartridges in the accessor and if there are two available drive units:

transporting first and second cartridges to the cell area;

putting the first cartridge in a first storage cell;

exchanging the second cartridge for a third cartridge in a second storage cell;

getting a fourth cartridge from a third storage cell;

transporting the third and fourth cartridges to the drive area;

putting the third cartridge in a first available drive unit; and putting the fourth cartridge in a second available drive unit; and D1 bii) if there are two cartridges in the accessor and if there is only one available drive unit:

transporting first and second cartridges to the cell area;

putting the first cartridge in a first storage cell;

exchanging the second cartridge for a third cartridge in a second storage cell;

getting a fourth cartridge from a third storage cell;

transporting the third and fourth cartridges to the drive area;

putting the third cartridge in a first available drive unit; and exchanging the fourth cartridge for a fifth cartridge in a second available drive unit.

12. The program storage medium of claim 9, wherein the program further comprises instructions for:
   E) executing the first command;
   F) if, after execution of the first command has been completed, the accessor is in the drive area and a second command is not in the queue, moving the accessor to the cell area; and
   G) waiting for a second command to be received.

13. In an automated storage and retrieval library housing a plurality of removable data cartridges in an array of storage cells in a cell area of the library, the library having at least one drive unit in a drive area of the library for reading information from the cartridges, the improvement comprising:

an accessor for transporting multiple cartridges within the library;

a queue for storing accessor activity commands; and a library controller interconnected with said queue, the accessor and the drive units, said library controller including means for directing the machine executable steps of:

A) receiving a first command in said queue;
B) determining if said accessor is in the drive area of the library or in the cell area of the library;
C) if said accessor is in the cell area of the library:
   C1) determining if the first command is a command to move a cartridge or to exchange cartridges;
      C1a) if the first command received is a command to exchange cartridges at a drive unit, determining if a second command in said queue is a command to move a cartridge from a drive unit to a storage cell or to move a cartridge from a storage cell to a drive unit;
         C1ai) if the second command is a command to move a cartridge from a drive unit to a storage cell:

getting a first cartridge from a first storage cell;

transporting the first cartridge to a first drive unit in the drive area;

exchanging the first cartridge for a second cartridge in said first drive unit;

getting a third cartridge from a second drive unit;

transporting the second and third cartridges to the cell area;

putting the second cartridge into a second cell; and putting the third cartridge into a third cell; and C1aii) if the second command is a command to move a cartridge from a storage cell to a drive unit:

getting a first cartridge from a first storage cell;

getting a second cartridge from a second storage cell;

transporting the first and second cartridges to the drive area;

putting the first cartridge in a first drive unit;

exchanging the second cartridge for a third cartridge in a second drive unit;

transporting the third cartridge to the cell area; and putting the third cartridge in a third storage cell; and D) if said accessor is in the drive area of the library:
   D1) if the first command is a command to move at least one cartridge, determining if a second command in said queue is a command to exchange cartridges;
      D1a) if the second command in said queue is a command to exchange cartridges at a cell, determining if the first command is a command to move a cartridge from a drive unit to a storage cell;
         D1ai) if the first command is a command to move a cartridge from a drive unit to a storage cell:

getting a first cartridge from a first drive unit;

getting a second cartridge from a second drive unit;

transporting the first and second cartridges to the cell area;

putting the second cartridge in a second cell; and exchanging the first cartridge for a third cartridge in a first cell; and D1aii) if the first command is a command to move a cartridge from a storage cell to a drive unit:

getting a first cartridge from a first drive unit;

transporting the first cartridge to the cell area;

exchanging the first cartridge for a second cartridge in a first storage cell;

getting a third cartridge from a second storage cell;

transporting the third cartridge to the drive area; and putting the third cartridge in a second drive unit.

* * * * *